July 18, 1944.  G. D. SCOTT  2,353,935
TIRE
Filed March 9, 1943
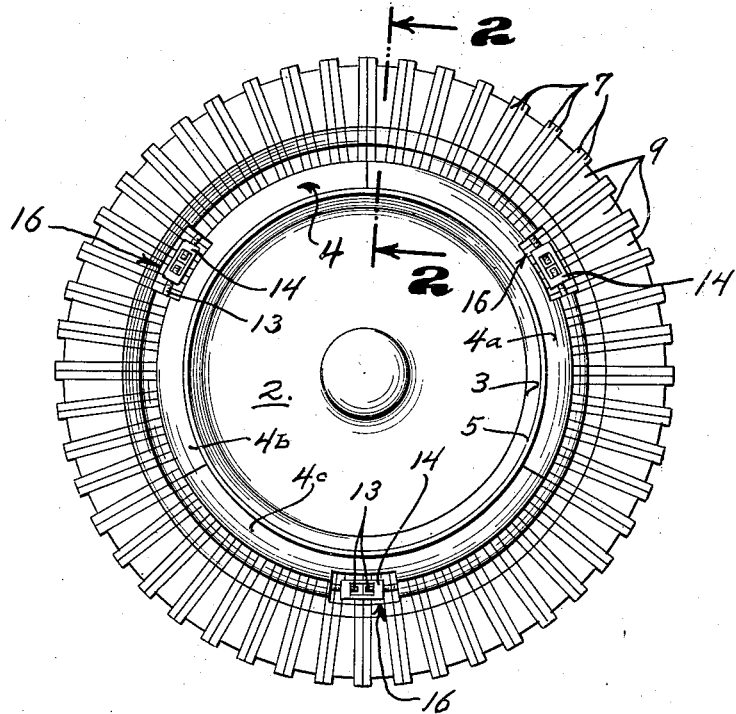
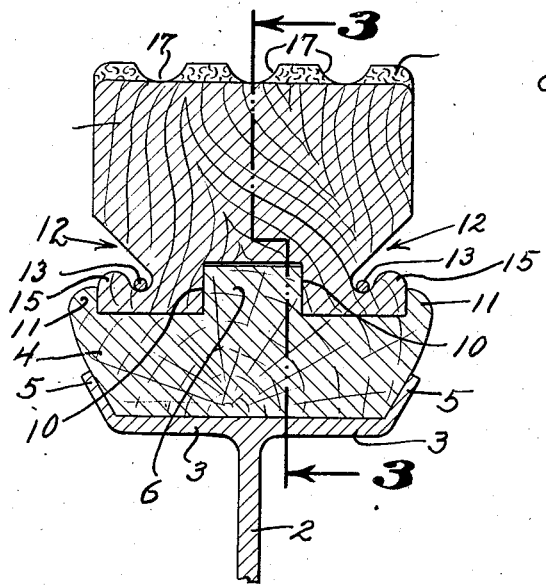
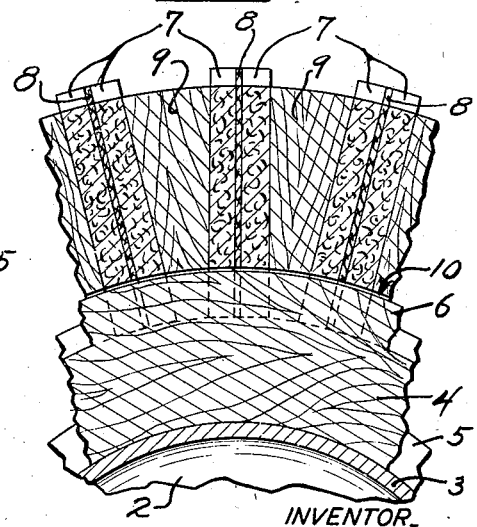
INVENTOR,
GEORGE D. SCOTT.
BY
Chas. E. Townsend
ATTORNEY Patented July 18, 1944

2,353,935

UNITED STATES PATENT OFFICE 2,353,935

TIRE

George D. Scott, San Francisco, Calif.

Application March 9, 1943, Serial No. 478,505

3 Claims. (Cl. 152—303)

This invention relates to tires and more particularly to a laminated tire for use on automotive vehicles and the like.

The novel tire is essentially a wooden tire with a tread surface provided thereon. The tread is composed essentially of a plurality of sections or plates of rawhide, plastic or other somewhat resilient similar material, with interposed wedge-shaped wooden blocks or spacers of similar material positioned between the resilient plates or a series of plates, circumferentially and radially of a wooden rim. Instead of using an inflated rubber tube or a similar core, the tire is made of a series of sections or laminae of solid material, some of which have resilient characteristics.

Generally stated, the object of the invention is to provide a tire adapted for use on automotive vehicles which utilizes no rubber or other material having a similar critical value during times of war emergency. Other objects of the invention are to provide a laminated tire which is durable in use and which will have characteristics designed to prevent undesired skidding on travel surfaces; to provide a tire comparatively inexpensive to manufacture and assemble; to provide a tire which may be adapted for use on conventional steel rims presently in use on automotive vehicles; to provide a tire which can be securely fitted to a conventional steel rim without danger of loosening therefrom; and to provide a tire which will form non-skid tread during use thereof.

Other objects and advantages will become apparent upon reading the following description and referring to the annexed drawing which is made a part hereof.

With reference to the drawing, in which similar characters of reference represent corresponding parts in the several views:

Fig. 1 is a side elevational view of my laminated tire mounted on a conventional wheel.

Fig. 2 is a transverse sectional view of my laminated tire taken on line 2—2 of Fig. 1.

Fig. 3 is a sectional view of my tire taken on line 3—3 of Fig. 2.

In Fig. 1, a conventional wheel is indicated generally at 2, which supports a conventional steel rim 3, to which an auxiliary wooden rim, indicated generally at 4, is mounted. The said auxiliary rim forms part of my tire structure and is referred to as a "rim" only for purposes of facility and clarity of description. The conventional type of steel rim is provided with side shoulders 5 which retain the wooden auxiliary rim in position.

For facility in assembly, I prefer to make my wooden rim in two or three arcuate segments, illustrated herein as three in number and indicated as 4a, 4b and 4c. It should be remembered that the outside peripheral tire-seating surfaces of conventional steel rims differ in contour and that the arcuate segments of my wooden rim 4 are designed to conform to the configuration of the particular steel rims to which they are to be affixed. The wooden rim segments are provided with centrally similarly positioned upwardly projecting lugs which, when aligned circumferentially of the steel rim, form lug 6. Plates 7 of rawhide, resilient plastic, or other suitable material, are positioned on the wooden rim by recessing the bottom portions thereof in conformity with the projecting lug 6.

Sheets of canvas or other fabric 8, or other suitable material, are interposed between adjacent plates 7 in order to provide a better gripping surface for the tread surface of the tire. It is noted that a plurality of plates with interposed canvas sheets or similar material are positioned adjacent one another. The drawing, for the purpose of description, shows only two plates 7 positioned together but in practice it may be desirable to so position more than two.

Interposed between each set or series of plates is a wedge-shaped spacer 9 formed of wood, plastic or other suitable material. The spacers are utilized to effect a saving of the resilient material employed in the plates, and to provide a tread forming tire surface as is hereinafter discussed, and are suitably tapered in order to provide a circular outer periphery for the tire, i. e., tapered inwardly toward the inner perimeter of the tire. The spacers are tapered rather than the plates, as it has been found to be quite difficult to form rawhide plates or plates formed of similar material with the appropriate taper. In the event the plates are of varying shapes and thicknesses, as might be the case if natural rawhide were used, the spacers are, of course, tapered accordingly in order to provide the round outer periphery of the tire tread surface. The bottom portions of spacers and canvas sheets are recessed in the same manner as the plates aforesaid so that they all may be keyed to the projecting lug 6 formed on the wooden rim 4. The recess or groove in the spacers, plates and canvas sheets is indicated generally at 10.

I prefer to provide retaining shoulders 11, or other appropriate means, on the side edges of the auxiliary rim 4 which project outwardly therefrom to engage the side edges of the laminae to restrain the said laminae from lateral displacement.

Notches 12 are provided on the sides of each plate, canvas sheet, and spacer, adjacent to the bottom rim seating portions thereof. Threaded rods or cables 13, which are fastened together by turnbuckles or hexagonal or other type nuts 14 are positioned within the notches and when tightened, hold the tire laminae and wooden rim securely together and to the steel rim of the conventional wheel. It is noted that the notches 12 are formed with outer, radially outwardly projecting shoulder portions 15 in order to prevent the said rods or cables from working out of their seated positions. The notches may be enlarged as at 16 at the points where the turnbuckles are located in order to facilitate tightening thereof. It is obvious that additional notches and seated rods or cables may be employed if deemed desirable or expedient.

It is noted that the plates and canvas sheets extend slightly outwardly beyond tops of the spacers and thereby provide a tread for the tire. As the tire wears down, the resilient plates will wear faster than the adjacent spacers, or vice versa, depending upon the respective materials use, and consequently a semblance of this tread will be preserved. Further, grooves 17 may be provided in the projecting portions of the plates in order to prevent lateral skidding of the tire when it is first put in use.

It should be noted that the auxiliary wooden rim is preferably treated with a weather-proofing material such as creosote or paint, so that it will not unduly shrink or swell after it has been placed in use. Similarly, the spacers, plates and/or sheets of canvas may be treated appropriately in order to prevent undue wear, shrinkage, and swelling thereof.

I have referred to certain other details of structure and assembly for the purposes of better describing the invention but it is understood that variations and modifications may be made within the spirit and scope of the invention as limited only by the scope of the appended claims.

I claim:

1. A tire for automotive vehicles and the like adapted to be mounted on a conventional steel rim, said tire comprising in combination an auxiliary wooden rim, said auxiliary rim composed of a plurality of arcuate segments, laminae each connected at one end to said auxiliary rim and extending radially outwardly therefrom and circumferentially of said auxiliary rim, said laminae comprising a plurality of sets of plates of resilient material and a sheet of fabric interposed between the plates of each set, and a wedge-shaped spacer member of material less resilient than said plates interposed between each set of plates, said plates and sheet of fabric being initially slightly longer than said spacers, a notch provided in the sides of said laminae and formed to retain a rod seated therein, and fastening means to join the ends of said rod together, said fastening means including means to tighten or loosen selectively said rod.

2. A tire for automotive vehicles and the like adapted to be mounted on a conventional steel rim, said tire comprising in combination a segmented auxiliary wooden ring, laminae each removably connected at one end to said wooden rim against lateral displacement therefrom and extending radially outwardly therefrom and circumferentially of said auxiliary rim, said laminae composed of a series of sets of resilient plates having a sheet of fabric interposed between the said plates in each set and wedge-shaped spacers formed of material less resilient than said plates interposed between the sets of said plates, said plates and sheet of fabric being initially slightly longer than said spacers, a notch formed in each of the sides of each laminae adjacent to the auxiliary rim-seating portions thereof for reception of a plurality of rods, and turnbuckles adapted to join the ends of said rods together and selectively tighten or loosen said rods.

3. A tread-forming tire of the character described adapted to be mounted on a conventional steel rim, said tire comprising an auxiliary wooden rim, laminae each connected at one end to said auxiliary rim and extending radially outwardly therefrom and circumferentially of said auxiliary rim, said laminae composed of a series of sets of resilient plates and a tapered spacer interposed between each pair of sets of resilient plates, said spacers being formed of material less resilient than said plates and initially slightly shorter than said resilient plates, and means to hold removably said laminae and auxiliary rim to a steel rim including a notch provided in each of said laminae on the sides thereof and adjustable tightening rods seated in said notches.

GEORGE D. SCOTT.